(12) United States Patent  
Kukulies

(10) Patent No.: US 9,845,100 B2
(45) Date of Patent: Dec. 19, 2017

(54) TROLLEY FOR TRANSPORTING LOADS

(75) Inventor: Paul James Kukulies, Fernvale (AU)

(73) Assignee: Ashley Dean Olsson, Goulburn, New South Wales (AU)

( * ) Notice: Subject to any disclaimer, the term of this patent is extended or adjusted under 35 U.S.C. 154(b) by 848 days.

(21) Appl. No.: 13/808,896

(22) PCT Filed: Jul. 7, 2011

(86) PCT No.: PCT/AU2011/000863
§ 371 (c)(1),
(2), (4) Date: Sep. 9, 2013

(87) PCT Pub. No.: WO2012/003547
PCT Pub. Date: Jan. 12, 2012

(65) Prior Publication Data
US 2015/0298715 A1    Oct. 22, 2015

(30) Foreign Application Priority Data

Jul. 7, 2010 (AU) ................................. 2010100723
Mar. 31, 2011 (AU) ................................. 2011901197

(51) Int. Cl.
*B62B 1/00* (2006.01)
*B62B 1/10* (2006.01)
(Continued)

(52) U.S. Cl.
CPC ................ *B62B 1/10* (2013.01); *B62B 1/008* (2013.01); *B62B 1/12* (2013.01); *B62B 5/06* (2013.01);
(Continued)

(58) Field of Classification Search
CPC .. B62B 1/00; B62B 1/008; B62B 1/12; B62B 1/18; B62B 1/20; B62B 1/206; B62B 5/067
See application file for complete search history.

(56) References Cited

U.S. PATENT DOCUMENTS 917,414 A  *  4/1909  Cooper ..................... B62B 1/18
                                                        280/47.33
1,795,856 A     3/1931  Gravatt
                (Continued)

FOREIGN PATENT DOCUMENTS

AU            95328 S        2/1986
AU           152220          7/2003
                (Continued)

OTHER PUBLICATIONS

Examination Report, issued in NZ Patent Application No. 605813, dated Aug. 20, 2013, 2 pages.
(Continued)

*Primary Examiner* — James A Shriver, II
*Assistant Examiner* — Steve Clemmons
(74) *Attorney, Agent, or Firm* — Schwabe Williamson & Wyatt, PC

(57) ABSTRACT

A trolley as disclosed for manual transport of loads. The trolley comprises one or more wheels, an axle, a pair of handles which extend upwardly when the trolley is in an upright, non-travel position, a load carrying frame extending forward from the handles, and a pair of spaced support legs extending down from the load carrying frame and positioned either side of the one or more wheels. The support legs are adapted to support the load carrying frame substantially parallel to a support surface, such as the ground, when the trolley is in the upright, non-travel position.

22 Claims, 10 Drawing Sheets

(51) Int. Cl.
*B62B 1/12* (2006.01)
*B62B 5/06* (2006.01)
(52) U.S. Cl.
CPC ......... *B62B 5/067* (2013.01); *B62B 2205/006* (2013.01); *B62B 2301/00* (2013.01)

(56) References Cited

U.S. PATENT DOCUMENTS

| | | | |
|---|---|---|---|
| D154,640 S * | 7/1949 | Sasser | 280/3 |
| 2,553,334 A * | 5/1951 | Schmidt | B62B 1/206 |
| | | | 248/175 |
| 3,279,810 A * | 10/1966 | Ashworth | B62B 1/22 |
| | | | 280/47.3 |
| 3,560,015 A * | 2/1971 | Tracy | B62B 1/12 |
| | | | 224/153 |
| 3,620,364 A * | 11/1971 | Lynch | B62B 1/206 |
| | | | 206/335 |
| 3,782,752 A * | 1/1974 | Gobetz | B62B 1/12 |
| | | | 14/35 |
| 4,343,483 A | 8/1982 | Base | |
| 4,521,030 A * | 6/1985 | Vance | B62B 1/12 |
| | | | 280/42 |
| 4,582,165 A * | 4/1986 | Latini | A01M 31/02 |
| | | | 108/152 |
| 4,784,405 A * | 11/1988 | Stein | B62B 1/12 |
| | | | 280/47.29 |
| 4,887,837 A | 12/1989 | Bonewicz, Jr. et al. | |
| 4,953,888 A | 9/1990 | Stein | |
| 5,040,808 A * | 8/1991 | McIntyre | B62B 1/18 |
| | | | 248/129 |
| 5,106,113 A * | 4/1992 | Piacentini | B62B 1/22 |
| | | | 280/38 |
| 5,149,116 A * | 9/1992 | Donze | B62B 1/20 |
| | | | 280/47.26 |
| 5,318,315 A * | 6/1994 | White | B62B 1/10 |
| | | | 280/47.18 |
| 5,348,325 A | 9/1994 | Abrams | |
| 5,601,298 A * | 2/1997 | Watanabe | B62B 1/22 |
| | | | 280/47.31 |
| 5,660,403 A * | 8/1997 | O'Neill | B62B 1/10 |
| | | | 280/47.19 |
| 5,884,924 A | 3/1999 | Fairchild | |
| 6,039,333 A * | 3/2000 | Hamblin | B62B 5/068 |
| | | | 280/1.5 |
| 6,336,254 B1 * | 1/2002 | Graff | B62B 5/06 |
| | | | 16/422 |
| 6,341,787 B1 * | 1/2002 | Mason | B62B 1/18 |
| | | | 280/47.26 |
| 6,390,495 B1 | 5/2002 | Cates | |
| 6,554,301 B2 * | 4/2003 | Scott | B62B 1/20 |
| | | | 280/47.12 |
| 6,715,775 B2 * | 4/2004 | Abel | B62B 1/18 |
| | | | 280/47.31 |
| 6,722,672 B2 | 4/2004 | Cates et al. | |
| 6,988,737 B1 * | 1/2006 | Clark | B62B 1/26 |
| | | | 280/47.26 |
| 7,316,407 B1 * | 1/2008 | Elden | B62B 1/12 |
| | | | 280/124.12 |
| 7,866,686 B2 * | 1/2011 | Conaway | B62B 1/208 |
| | | | 280/47.31 |
| 7,959,182 B2 * | 6/2011 | Klein | A01K 97/01 |
| | | | 280/47.18 |
| 8,162,349 B1 * | 4/2012 | Roselle | B62B 1/008 |
| | | | 280/639 |
| 8,235,153 B2 * | 8/2012 | Robinson | B60L 11/18 |
| | | | 180/19.3 |

FOREIGN PATENT DOCUMENTS

| | | | | |
|---|---|---|---|---|
| AU | 300255 | | 11/2004 | |
| AU | 300256 | | 11/2004 | |
| CN | 2642614 | | 9/2004 | |
| CN | 2889823 | | 4/2007 | |
| CN | 101468653 | | 7/2009 | |
| CZ | 18217 | | 2/2008 | |
| DE | 19942651 A1 * | | 3/2001 | ............... B62B 1/20 |
| DE | 102007015096 | | 10/2008 | |
| EP | 1561665 | | 8/2005 | |
| FR | 2754231 | | 4/1998 | |
| FR | 2785586 | | 5/2000 | |
| GB | 388559 A * | | 3/1933 | ............... B62B 1/18 |
| GB | 469446 A * | | 7/1937 | ............... B62B 1/18 |
| GB | 574071 | | 12/1945 | |
| GB | 2303588 | | 2/1997 | |
| GB | 2399321 | | 9/2004 | |
| JP | 11157451 A * | | 6/1999 | |
| JP | 2003104206 | | 4/2003 | |
| KR | WO 2010067925 A1 * | | 6/2010 | ............... B62B 1/12 |
| NZ | 148147 | | 8/1968 | |
| WO | 0204285 A1 | | 1/2002 | |

OTHER PUBLICATIONS

International Search Report received for PCT Patent Application No. PCT/AU11/000863, dated Sep. 27, 2011, 2 pages.
International Preliminary Report on Patentability and Written Opinion received for PCT Patent Application No. PCT/AU11/000863, dated Jan. 8, 2013, 8 pages.

* cited by examiner

TROLLEY FOR TRANSPORTING LOADS

CROSS REFERENCE TO RELATED APPLICATIONS

The present application is a U.S. National Stage of International Patent Application No. PCT/AU2011/000863, filed Jul. 7, 2011, entitled "Trolley for Transporting Loads," and which claims the benefit of AU Patent Application Nos. 2010100723 and 2011901197, filed Jul. 7, 2010 and Mar. 31, 2011, respectively. These disclosures are hereby incorporated by reference in their entireties.

FIELD OF THE INVENTION

The present invention relates to devices for manual transport of loads. In particular, the invention relates to a single wheel or dual wheel trolley for transporting loads across a range of surfaces.

BACKGROUND OF THE INVENTION

There are many devices provided that facilitate the transport of loads with a mechanical advantage provided to the user. The conventional wheelbarrow is a device of considerable history and has facilitated a wide range of human endeavours including in building and agricultural activities. This device generally has one wheel and is particularly suited for use on uneven, rough and/or soft surfaces. The conventional wheelbarrow, however, is somewhat limited in its stability at rest and requires placement of loads into and out of a bucket. Further, the conventional wheelbarrow requires lifting from a rest position for use. This mandates the conscious consideration of safe ergonomics to avoid potential physical injury.

Most conventional trolleys have two or more wheels and are intended for use on hard, even surfaces. However, there are many applications which require loads to be moved across uneven, rough, and/or soft surfaces and many conventional trolleys are not suitable for this purpose.

U.S. Pat. No. 4,343,483 is for a wood toter. The device has a frame rotatably supported by a pair of wheels, an arcuate panel member attached to the frame and a handle for gripping the wheeled carrier. The device is relatively load specific as it provides for the transverse location of fire logs or, in an alternative embodiment, longitudinal placement of logs. The second embodiment has a significant distance between a carry handle and the wheels with the majority of the load carried in that space and its centre of gravity being located anterior to the wheel. The first embodiment has a deep bucket shape with open sides. It necessitates the placing of a load either over the top of the arrangement or on the side with forward extension of the arms in either application.

Czech Patent No. 18217 appears to describe a single wheel wheelchair with coil suspension. The centre of gravity of a passenger appears to be located almost directly above the axle of the arrangement. It is task specific.

French Patent No. 2754231 describes a two-wheel transporter for a large bin and is operated by placing a load within the bin and drawing it much in the way of the "wheelie bin". Access to the carrying compartment is again an "up and over" type approach to depositing a load within its compartment. The disclosure is to a container on a vertical upright on two wheels. The container is formed as an open box with flat sides and rounded corners.

U.K. Patent No. 2,303,588 is to a trolley for carrying baskets such as shopping baskets. The device has hooks on arms which allow the removable support of one or more baskets. A small support foot is provided. Again, this item is very specific in its application.

None of the above items provides an easy and ergonomic alternative to traditional means of lever assisted wheeling of loads.

OBJECT OF THE INVENTION

The object of the invention is to overcome or at least alleviate one or more of the above disadvantages of the prior art, or to at least provide for a useful commercial choice.

SUMMARY OF THE INVENTION

In a first and not necessarily the broadest aspect, the invention resides in a trolley for manual transport of loads, the trolley comprising:
  one or more wheels, preferably pneumatic;
  an axle operatively coupled to the one or more wheels;
  a pair of handles connected directly or indirectly to the axle, the handles extending upwardly when the trolley is in an upright, non-travel position;
  a load carrying frame extending forward from the handles; and
  a pair of spaced support legs extending down from the load carrying frame and positioned either side of the one or more wheels, the pair of legs adapted to support the load carrying frame substantially parallel to a support surface, such as the ground, when the trolley is in the upright, non-travel position.

The term "parallel" is intended to include approximately parallel. Further, the term "extending forward" is intended to include extending transverse to the longitudinal axis of the handles.

In one embodiment of the invention, the trolley includes one wheel. Preferably, the wheel has a pneumatic tyre, similar to those used on commercially available wheelbarrows. Preferably, the wheel is mounted in a central position, between the handles.

In an alternative embodiment, the trolley includes two wheels, preferably pneumatic. It is preferred that the wheels are positioned either side of the handles, proximal to the support legs. Alternatively, both wheels can be mounted in a central position between the handles.

In a particularly preferred embodiment, the trolley is interchangeable between a one-wheel and two-wheel trolley.

Preferably, the handles each have three sections, being a first section, a second section, and an end section. The first section, located proximal to the axle is preferably substantially vertical when the trolley is at rest. The second section is continuous with the first section and is preferably angled outwardly. The end section, located distal to the axle, is continuous with the second section. The three sections may be formed integrally.

In a particularly preferred embodiment, the first and second sections of the handles are formed integrally and the end section is manufactured as a separate piece and secured to the second section by suitable attachment means.

In an alternative embodiment, each handle may be formed in a single piece which is angled outwardly.

In yet another alternative embodiment, the handles may be formed in two parts wherein the first section, located proximal to the axle, is angled outwardly, and the end section is manufactured as a separate piece and secured to the first section by any suitable attachment means.

In a preferred embodiment, a terminal portion of the end section is angled to a longitudinal axis of the end section. Preferably, the terminal portion is angled at 90 degrees. More preferably, the terminal portion is angled backwardly at 90 degrees.

The terms "vertical", "outwardly", "forward" and "backwardly" are used for the purposes of description only and are not intended to be limiting and, in general, are to be construed when the trolley is in an upright, non-travel position, unless the context indicates otherwise.

The end section of each handle preferably includes a handle grip.

In a preferred embodiment, a cross member is provided to brace the handles.

It is preferred that the trolley comprises a single axle which is adapted to be operatively coupled to the one or two wheels. The axle is preferably attached to the support legs. In a particularly preferred embodiment, the axle is removably attached to the support legs such that a one-wheel trolley can be converted to a two-wheel trolley, and vice versa, by removing the axle and changing the wheel configuration.

Preferably, the load carrying frame is rectangular or square, having a front member, a rear member and two side members.

Preferably, the support legs are substantially U-shaped. More preferably, the U-shaped legs form part of the frame and are positioned under the base of the carry tray i.e. the load carrying frame.

It is preferable that each support leg comprises two legs extending down from the load carrying frame, and a base. In a preferred embodiment, the two legs and the base are integrally formed.

The shape and positioning of the support legs allow the trolley to stand in upright position, with the handles perpendicular to the ground when at rest, for storage, loading and/or unloading.

The trolley may further include a load stabilising frame attached to the load carrying frame, the load stabilising frame preferably comprising a lower frame member, two vertical side members, and an upper frame member. The lower frame member and the upper frame member are preferably attached to the handles to provide additional support for the handles.

The load carrying frame and load stabilising frame may be any suitable configuration.

In a preferred embodiment, the trolley frame i.e. the load carrying frame and load stabilising frame, is constructed using tubular steel and welded joints.

In a particularly preferred embodiment, the load carrying frame and the load stabilising frame are both topped with a layer, preferably planar, to form a load carrying platform and load stabilising platform, respectively.

Preferably, the base of the carry tray, i.e. the load carrying layer, is positioned above the wheel and forward of the centre of the wheel (axle), and the back of the carry tray, i.e. the load stabilising layer, is positioned above the wheel and slightly forward of the centre of the wheel (axle).

Preferably, the carry tray base and back, i.e. the load carrying and load stabilising layer, are screwed, bolted or welded to the trolley frame i.e. the load carrying frame and load stabilising frame. The load carrying frame and load stabilising frame may also be constructed with "C" sections which are folded into sheet metal that may be used for the load carrying layer and load stabilising layer.

In a preferred embodiment, the load carrying frame and load carrying layer are integrally formed. Similarly, the load stabilising frame and load stabilising layer may also be integrally formed.

Suitably, the trolley may be provided as a complete assembled unit. In the alternative, the trolley may be provided in a ready-to-assemble flat pack or in kit form.

In a further aspect, the invention resides in a kit for forming a trolley, the kit comprising:
i. one or more wheels, preferably pneumatic;
ii. an axle for receiving the one or more wheels;
iii. a pair of handles;
iv. a load carrying frame; and
v. a pair of support legs;
wherein elements i to v may be assembled to form a single or dual wheeled trolley for the manual transport of loads.

The trolley is substantially as described above.

The kit may further include a load stabilising frame.

Preferably, the kit contains all the components necessary for a user to assemble a single wheel trolley, or alternatively, a dual wheeled trolley. The kit may also include the basic tools required for assembly of the trolley.

BRIEF DESCRIPTION OF THE DRAWINGS

Reference will now be made to the preferred embodiments of the present invention as illustrated in the following Figures, while understanding that the description is by way of example only.

DETAILED DESCRIPTION OF THE INVENTION

Figure 1:
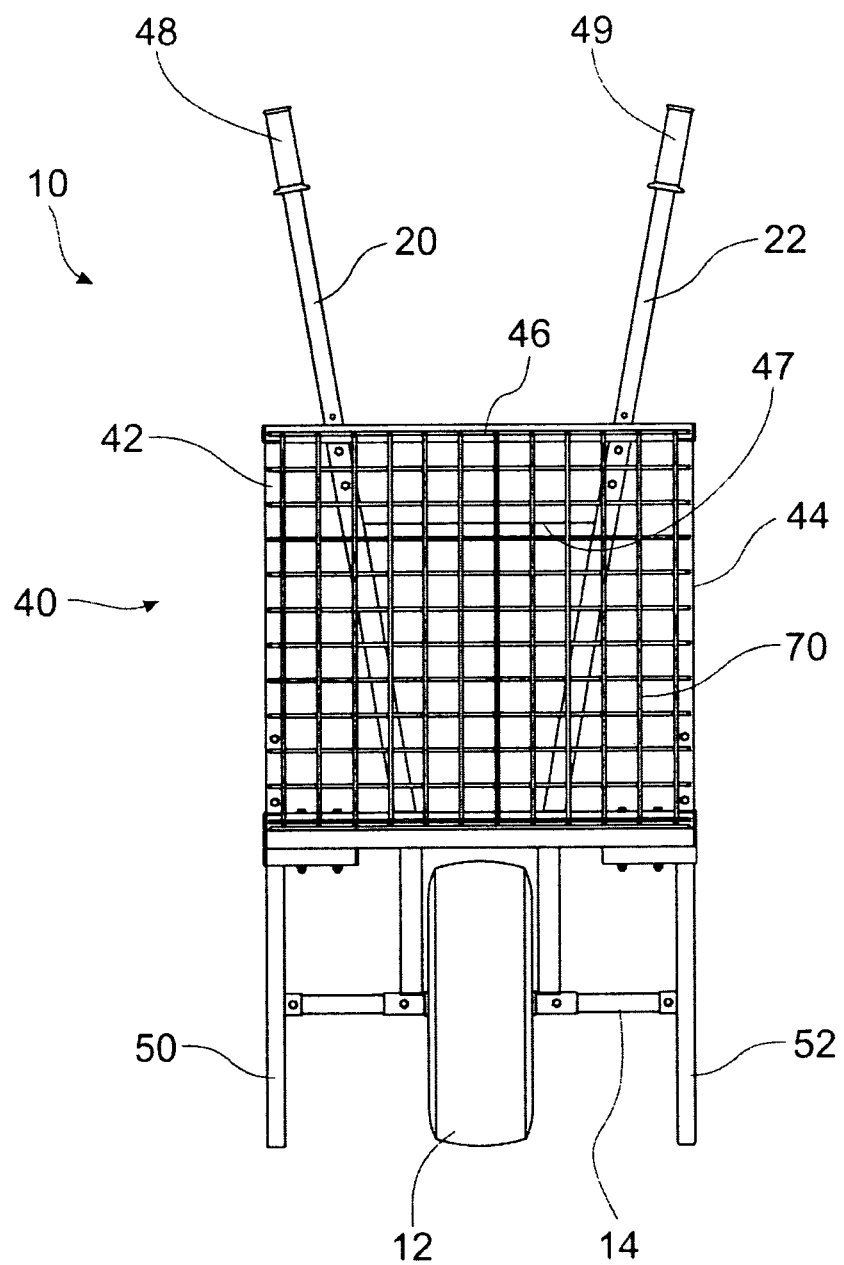
FIG. 1 is a front view of a single wheel trolley of the present invention.
Figure 2:
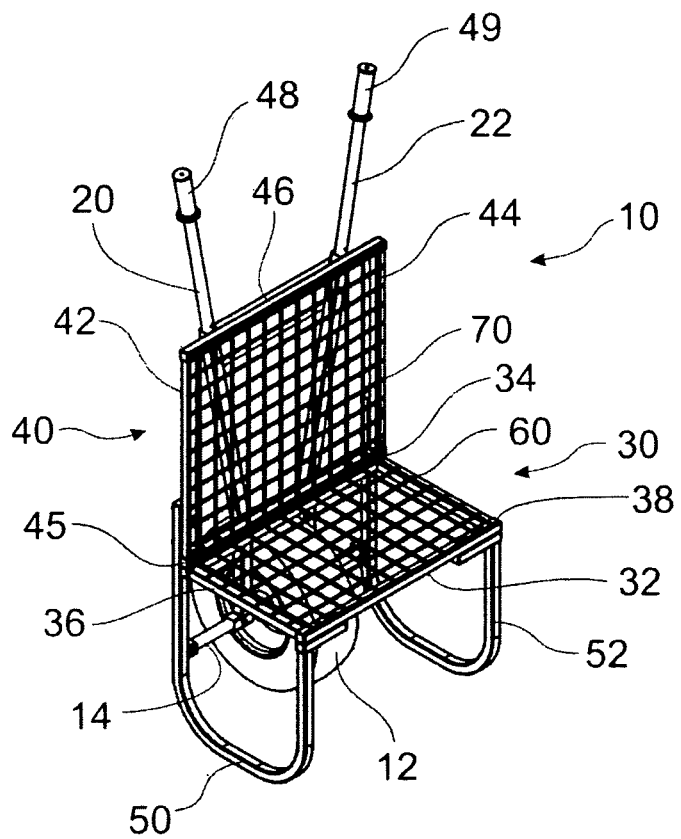
FIG. 2 is an isometric view of the trolley of FIG. 1.
Figure 3:
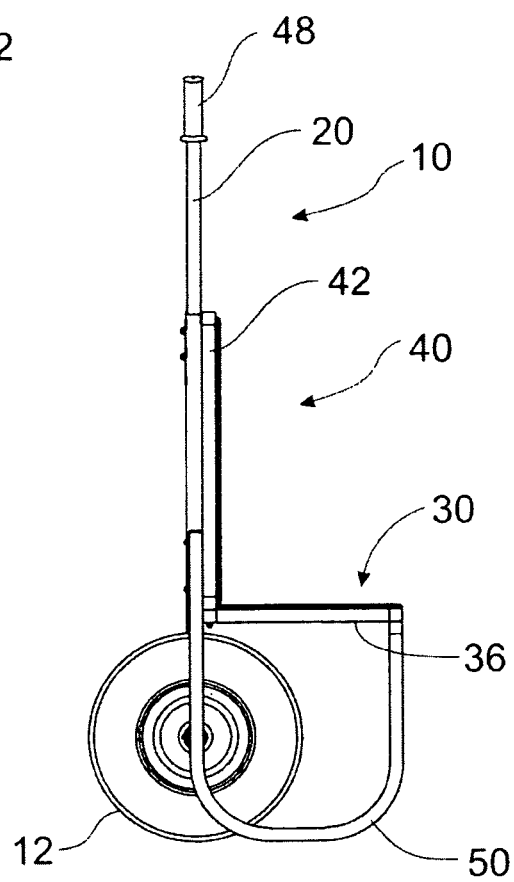
FIG. 3 is a left sided view of the trolley of FIG. 1.

FIGS. 1 to 3 show a first embodiment of a trolley 10 of the present invention. This invention has a single wheel, wheelbarrow mechanism mounted behind an L-shaped carry tray.

The trolley 10 has a wheel 12 operatively coupled to an axle 14. The axle and wheel are formed as is well-known in the art and may include one or more bearings or may be as simple as an arrangement of a shaft on one or more bushes. The wheel 12 preferably has a pneumatic tyre of a reasonably sized diameter and width, and is similar to those used on commercially available wheelbarrows.

Two handles 20, 22 are coupled to the axle 14. The handles 20, 22 diverge from each other in a direction away from the wheel as is most apparent in FIGS. 1 and 2. In this example, the handles initially extend from the axle in a substantially vertical orientation, before diverging away from the axle. The handles extend upwardly when the trolley is in an upright, non-travel position. The handles 20, 22 also include a cross member 47 to brace the handles. The handles 20, 22 are of a length to allow convenient use by an operator, and also include handle grips 48, 49.

A load carrying frame 30 is formed by a front member 32, a rear member 34 and two side members 36, 38. A load stabilising frame 40 is formed by two spaced vertical side members 42, 44, a lower frame member 45, and an upper frame member 46.

In this example, the rear member 34 of the load carrying frame is connected to the lower frame member 45 of the load stabilising frame. The lower frame member 45 and the upper frame member 46 are connected to the handles 20, 22, thereby bracing the handles and stabilising their position relative to each other. The cross member 47 on the handles 20, 22 also acts as a support for a name/brand plate which may be positioned between the upper frame member 46 of the load stabilising frame 40 and the cross member 47.

The trolley frame, i.e. the load carrying frame and load stabilising frame, can be constructed using tubular steel and welded joints; however persons skilled in the art would understand that other construction methods would also be suitable. For example, high strength polymers may be utilised. The load carrying frame and load stabilising frame may also be constructed with "C" sections which are folded into sheet metal that may be used for the load carrying layer and load stabilising layer.

A pair of support legs 50, 52 are positioned either side of the wheel 12 to support the load carrying frame 30 substantially parallel to a surface on which it is located in an upright non-travel position. This is particularly evident in FIG. 3. The support legs 50, 52 are substantially U-shaped and depend from the side members 36, 38 of the load carrying frame 30. As shown in FIG. 3, the U-shaped legs form part of the frame and are positioned under the base of the carry tray. Each support leg 50, 52 comprises two legs which extend down from the load carrying frame 30, and a base. In this example, the two legs and the base are integrally formed. In this embodiment, the axle 14 is attached to the support legs 50, 52. FIG. 3 also highlights the intimate association of the load stabilising frame 40 and handles 20, 22.

As best illustrated in FIGS. 1 and 2, a load carrying layer 60 and a load stabilising layer 70 may be added to the load carrying frame 30 and load stabilising frame 40, respectively. This forms a load carrying platform and load stabilising platform. The base of the carry tray, or the load carrying layer 60, is positioned above the wheel and forward of the centre of the wheel (axle). The back of the carry tray, or the load stabilising layer 70, is positioned above the wheel and slightly forward of the centre of the wheel (axle).

In this example, the layers 60, 70 are made from mesh which is strong enough to carry the chosen load but also light weight and allowing for drainage. The mesh also provides multiple anchorage points for securing the load, if necessary. The layers 60, 70 may also be substantially planar with or without drainage holes. The addition of the layers 60, 70 allows for the loading of smaller items which otherwise may fall between the frame members of the first embodiment. The result is a chair-like arrangement which may be used for movement of appropriate loads.

The carry tray base and back, or load carrying layer 60 and load stabilising layer 70, may be constructed from any suitable material including plastic, wood (including plywood), metal (including folded sheet metal), steel, welded mesh, suitable other mesh, or suitable other polymer. The load carrying layer 60 and load stabilising layer 70 may be attached to the frame by any suitable means. For example, the carry tray base and back, or load carrying and stabilising layer, may be screwed, bolted or welded to the trolley frame.

The operation and advantages of the present invention are readily apparent. The trolley stands in upright position, with the handles perpendicular to the ground when at rest, for storage, loading and/or unloading. An item to be carried may be lifted onto the load carrying frame. The height needed to access this frame is only slightly higher than the frame itself. It is not necessary to place a load into a bucket by rising over an edge and leaning forward to place the load downwards over a side. The present invention is particularly useful for items with a base that extends beyond the frame dimensions in at least one direction. It is particularly well-suited for items such as welders which are heavy items with regular bases which would sit comfortably on the frame and slide and abut against the load stabilising frame. The trolley can be used to carry a range of packaged loads including boxes of goods, paper, drinks, tiles and bagged material including stock feed, pottery mix or cement. It may also be used to carry produce, solid building materials and portable equipment.

To move the trolley once the load is in position, it is approached from behind and the handles are pulled back towards the user so that the support legs clear the ground surface, and to achieve an L-shaped position. The user then pushes the trolley forwards, similar to a wheelbarrow. In this rotational operation, the arms pivot around the axis to provide a mechanical advantage to the user. The load may slide or sit in contact with the load carrying frame, thereby nesting into the right angled shape formed by the component. The user may then draw or push the load in a preferred direction.

In a preferred embodiment, the trolley is configured for easy maneuverability across soft, loose and uneven surfaces, steps and curbing. In addition to this, the trolley can also be used up and down stairs. The single wheel option is particularly suited for use on uneven surfaces and across sloping surfaces. A particular advantage of this embodiment of the invention is that the load can be placed on the load carrying frame without being tied down or anchored to the load carrying layer and/or the load stabilising layer. This is because the configuration of the single wheel trolley makes it easy for the user to level the trolley and the load, thereby reducing or removing side to side movement of the trolley and the load. As a result, the trolley and the load are subjected to up and down movement only.

FIGS. 4 to 7 show a second embodiment of a trolley 110 of the present invention. In this embodiment, the trolley 110 has two wheels 112, 113, operatively coupled to an axle 114. The two handles 120, 122 are directly or indirectly coupled to the axle 114. The handles 120, 122 initially extend from the axle 114 in a substantially vertical orientation, before diverging away from each other in a direction towards the wheels 112, 113. This is most apparent in FIG. 4. The handles extend upwardly when the trolley is in an upright, non-travel position.

Figure 7:
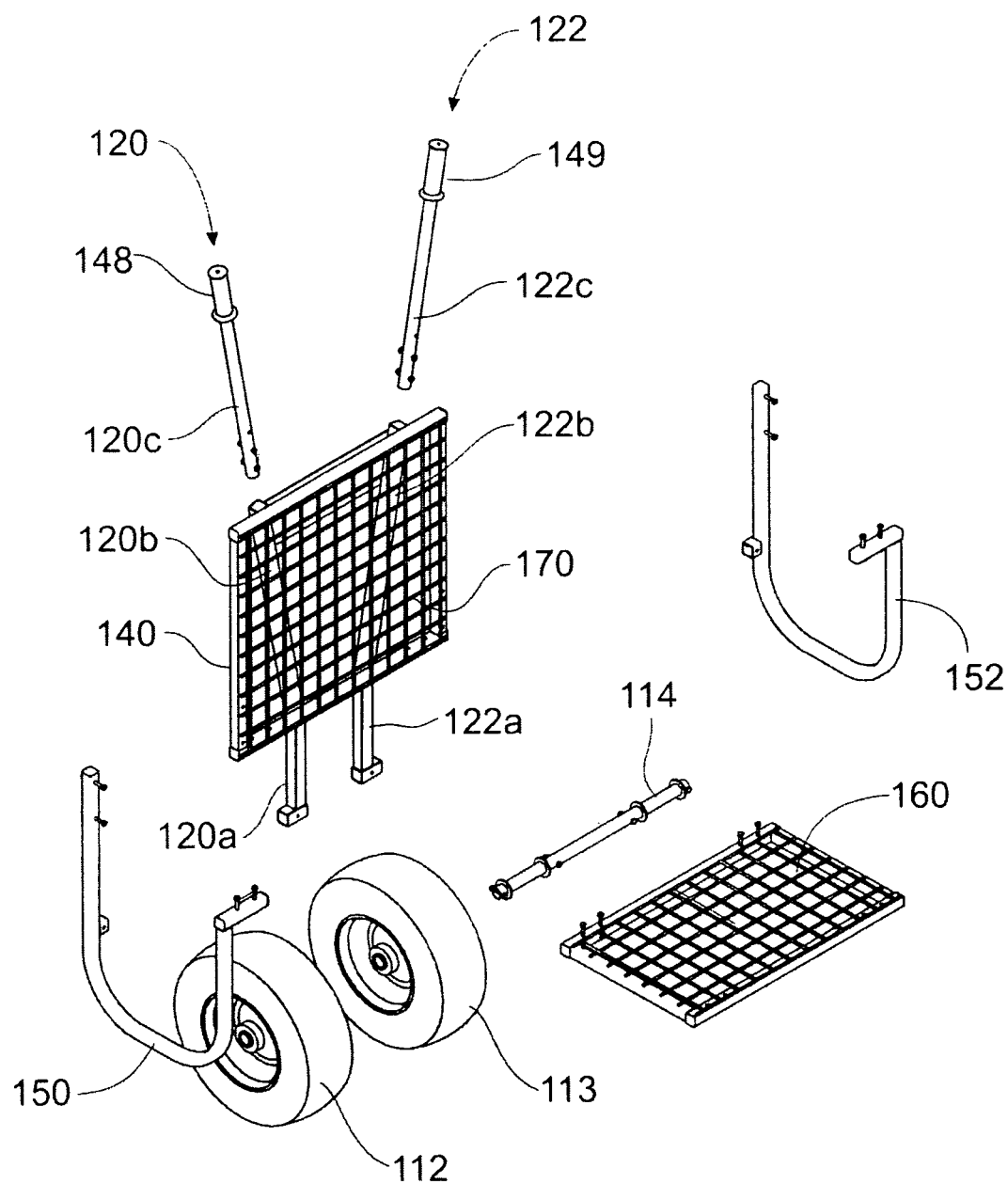
FIG. 7 is an exploded view of the trolley of FIG. 4.

As shown in FIG. 7, each handle 120, 122 is formed in three sections. The first section 120*a*, 122*a* being substantially vertical, and the second section 120*b*, 122*b* angled outwardly. In this example, the end section 120*c*, 122*c*, is manufactured separately and secured to the second section 120*b*, 122*b* of the handles by suitable attachment means. FIG. 7 also shows the first 120*a*, 122*a* and second sections 120*b*, 122*b* of the handles connected to the load stabilising frame 140, to provide additional support for the handles 120, 122. Each handle also includes a handle grip 148, 149.

Figure 4:
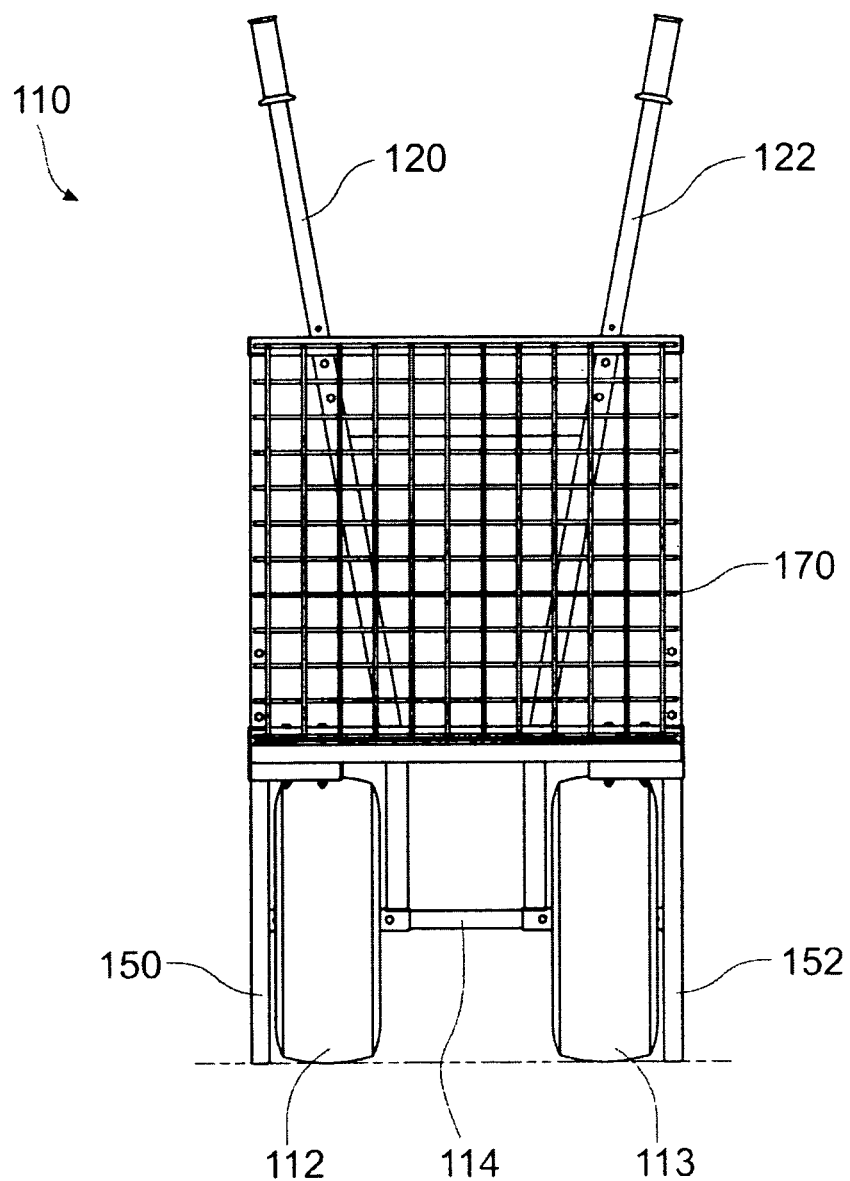
FIG. 4 is a front view of a dual wheel trolley of the present invention.
Figure 5:
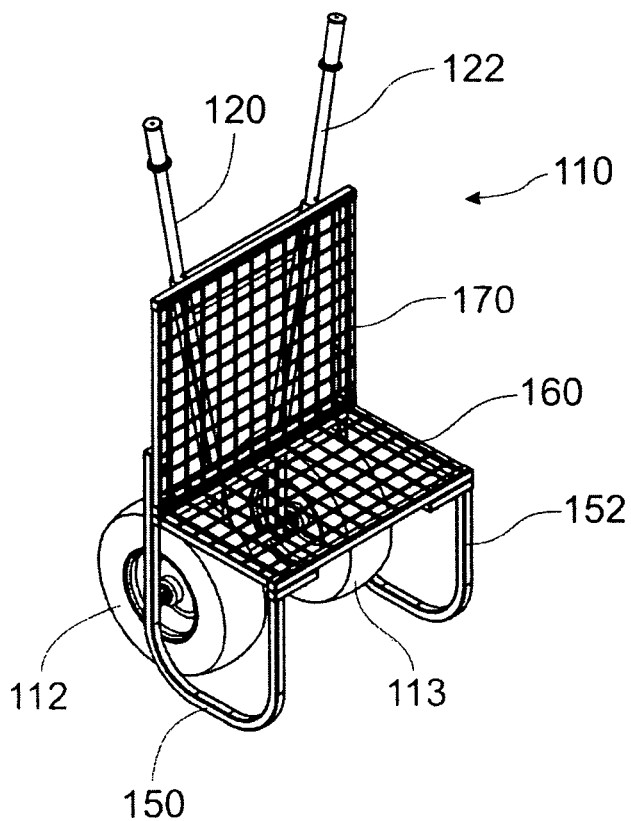
FIG. 5 is an isometric view of the trolley of FIG. 4.
Figure 6:
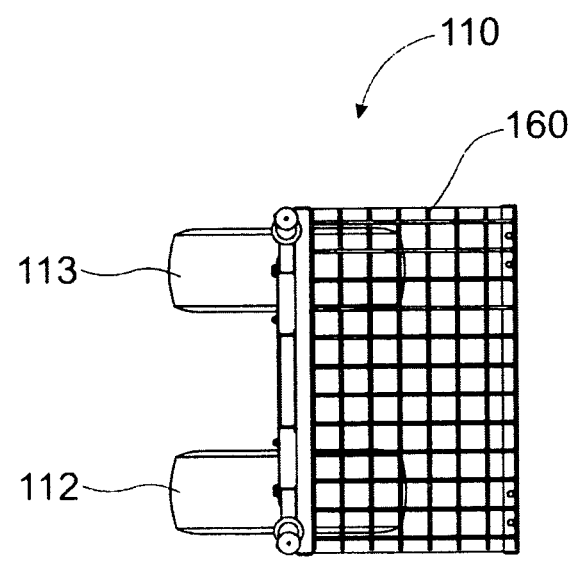
FIG. 6 is a plan view of the trolley of FIG. 4.

As particularly evident in FIGS. 4 and 5, the support legs 150, 152 are positioned adjacent to the outer side of each wheel 112, 113, and the axle 114 is connected to the support legs 150, 152. As shown in FIGS. 4 and 5, this embodiment of the invention may also include a load carrying layer 160 and load stabilising layer 170, to form a load carrying platform and load stabilising platform. The other components of the second embodiment of the invention are similar to those already described.

The dual wheel option is particularly suited for use on flat and/or even surfaces, or directly up and down sloping surfaces, as the trolley is self-leveling on such surfaces. The dual wheel trolley can also be used for movement of loads across an uneven surface or across sloping surfaces, however, the trolley and the load will move from side to side on such surfaces. Further, the trolley will adopt the angle of the slope when it is moved across a sloping surface. As a result, the load is generally required to be tied down or anchored to the load carrying layer and/or the load stabilising layer for such applications.

A particular advantage of one embodiment of the present invention is that the trolley may be configured to be interchangeable between a dual wheel and a single wheel trolley to best suit the surface over which the trolley will be moved. Thus, if necessary, a user can change the trolley configuration to the single wheel option when moving the load across a sloping surface or along an uneven surface. The trolley could then easily be changed back to the dual wheel configuration for use on a flat or even surface, or directly up or down a sloping surface.

The trolley can be changed from a dual wheel trolley to a single wheel trolley, by simply removing the axle from the support legs and/or handles, removing the wheels from the axle, moving one wheel to a central position between the handles, and re-attaching the axle support legs and/or handles. The trolley can be converted from a single wheel to a dual wheel configuration by following a similar process.

Another advantage of preferred embodiments of the invention is that the trolley stands upright when in a non-travel position and therefore occupies a relatively small space. This makes the trolley ideal for use or storage in confined areas, for example elevators, garden sheds, and storage cupboards.

Persons skilled in the art would appreciate that the trolley may be made in variety of sizes and still be suitable for use. Accordingly, the following dimensions are provided by way of example only. The overall height of the trolley shown in FIGS. 1 to 7, when standing in upright position, is preferably around 1.4 meters. The base of the carry tray, or load carrying frame, is preferably about 410 to 420 millimeters above the ground. Preferably, the overall width of the carry tray, or load carrying frame, is approximately 600 millimeters. It is preferred that the diameter of the wheel or wheels is about 400 millimeters. The width of the wheel or wheels is preferably about 150 millimeters, however a width of about 100 millimeters would also be suitable.

Figure 8:
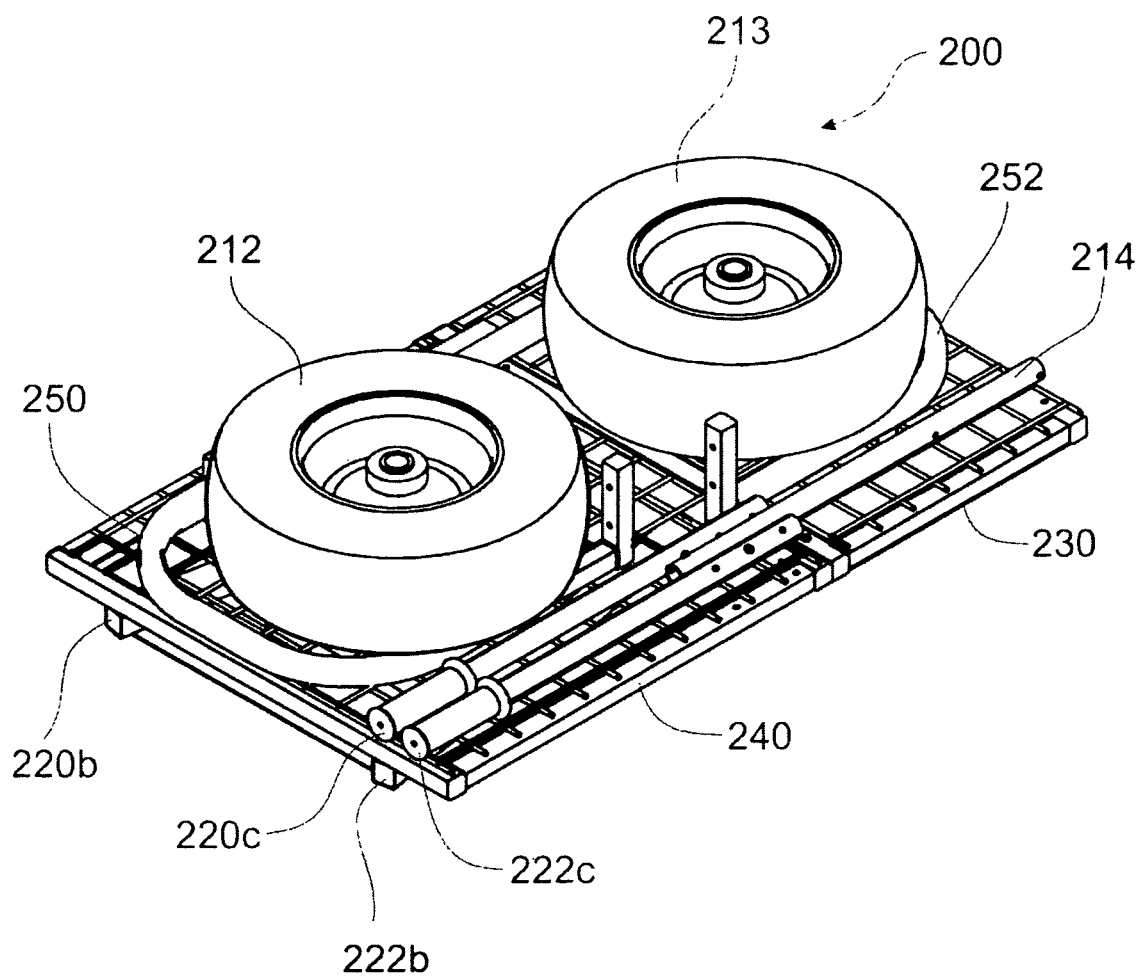
FIG. 8 is an isometric view of a kit for forming a single or dual wheeled trolley of the present invention.
Figure 9:
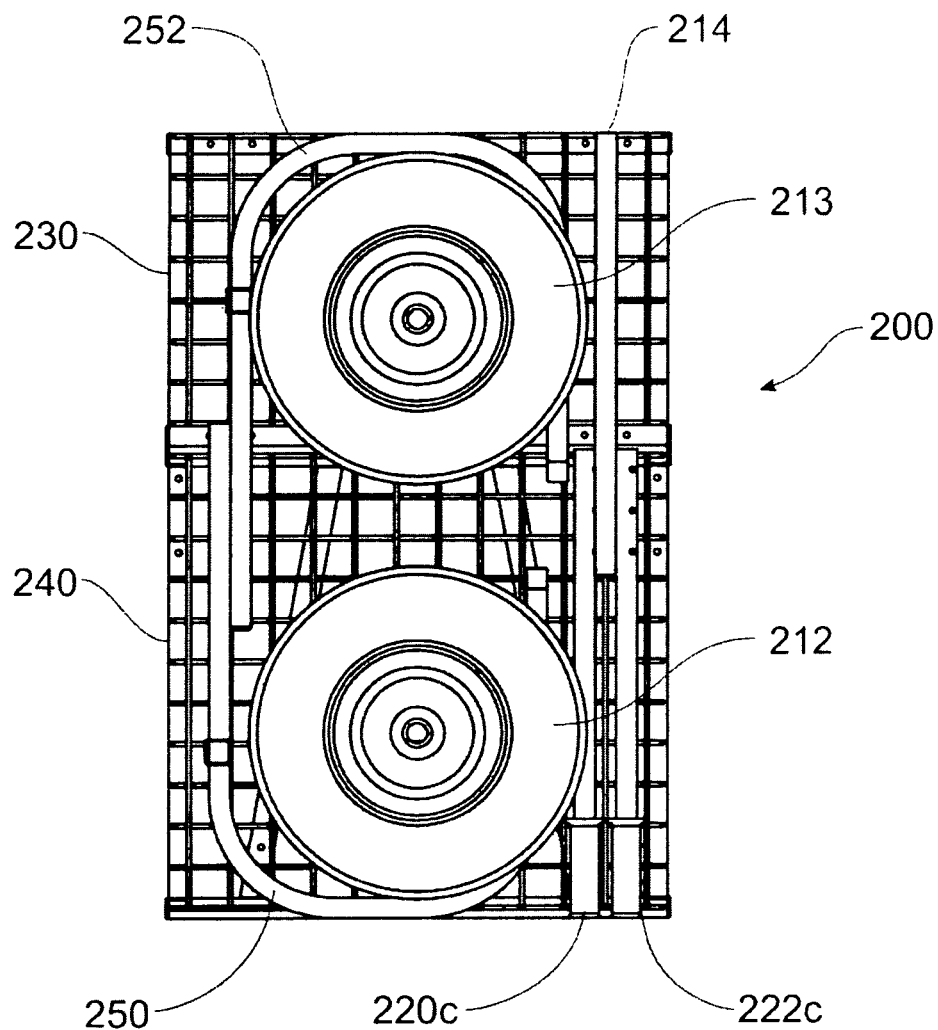
FIG. 9 is a plan view of the kit of FIG. 8.
Figure 10:
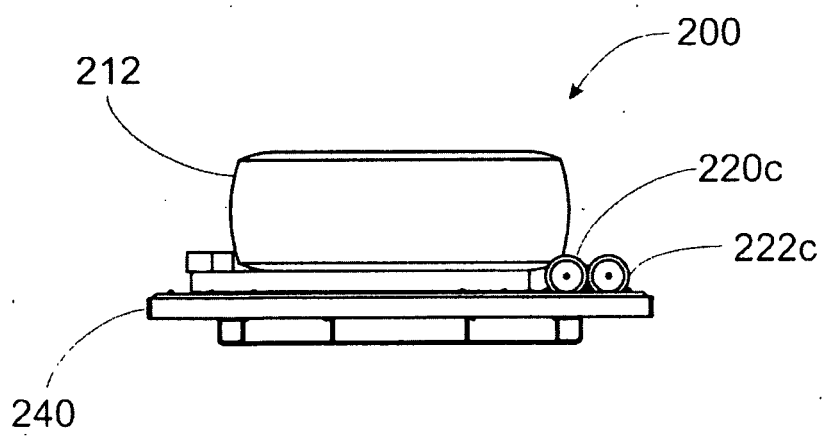
FIG. 10 is an end view of the kit of FIG. 8.
Figure 11:
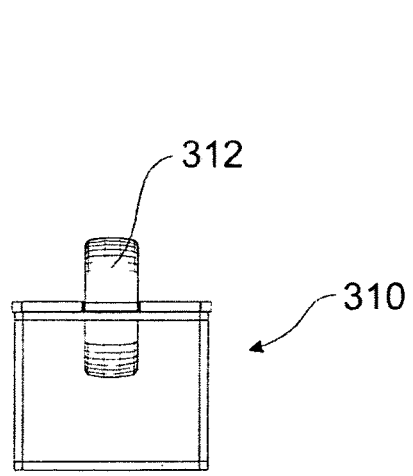
FIG. 11 is plan view of an alternative embodiment of a single wheel trolley of the present invention.
Figure 12:
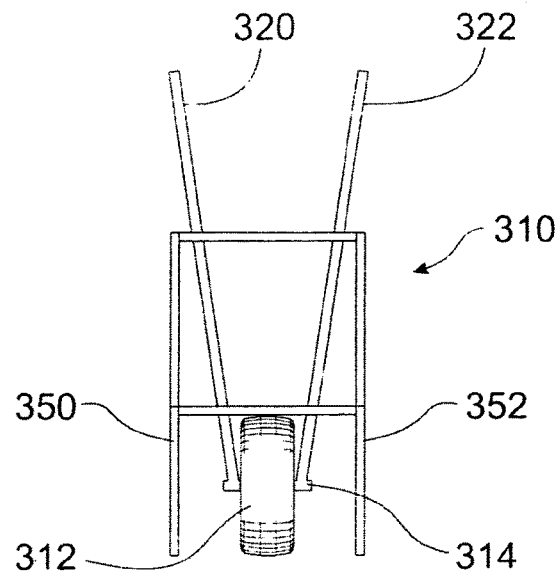
FIG. 12 is a front view of the trolley of FIG. 11.
Figure 13:
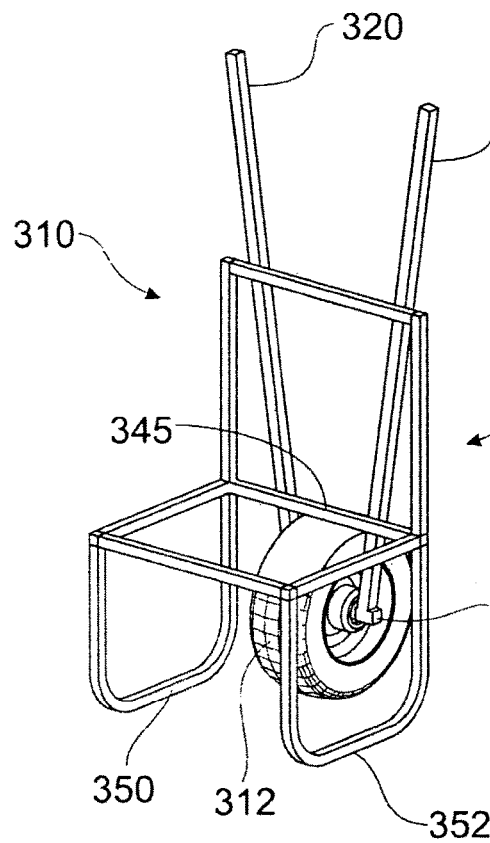
FIG. 13 is an upper front isometric view of the trolley of FIG. 11.
Figure 14:
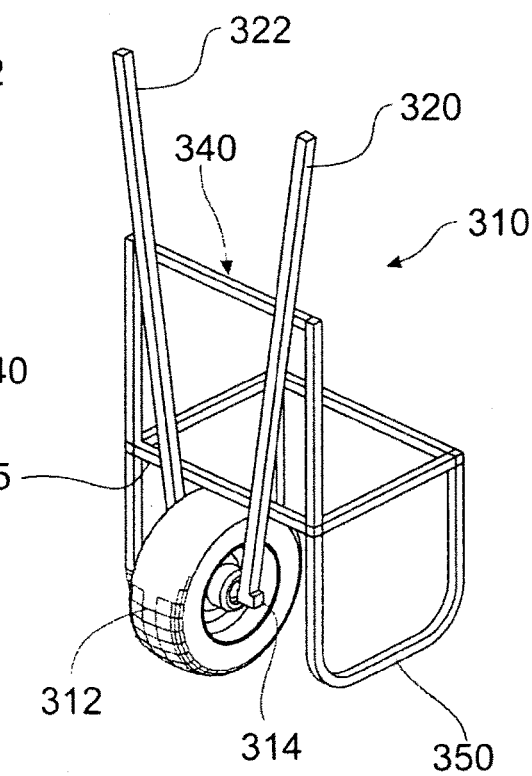
FIG. 14 is an upper rear isometric view of the trolley of FIG. 11.

FIGS. 8 to 10 show a third embodiment of the present invention. In this example, the trolley is provided in kit form for assembly by a user or other persons. The kit 200 comprises two wheels 212, 213 and an axle 214 which is adapted to support one or two wheels. The kit 200 also comprises handles 220*b*, 222*b*, 220*c*, 222*c*, a pair of legs 250, 252, a load carrying frame 230, and a load stabilising frame 240. As particularly evident in FIG. 8, the first and second sections 220*b*, 222*b*, of the handles are separated from the end section 220*c*, 222*c* of the handles, in order to provide a compact kit. The kit 200 may also include the basic tools, bolts and spacers required for assembly of the trolley.

The kit is preferably about 1000 millimeters in length, about 600 millimeters in width, and about 250 millimeters in height. The width of each wheel in the third embodiment of the invention shown in FIGS. 8 to 10 is preferably in the range of 100 to 150 millimeters.

Using the kit form of the trolley, a user is able to assemble a single wheel trolley, or alternatively a dual wheel trolley, according to their needs and preference.

FIGS. 11 to 14 show a fourth embodiment of the present invention. In this embodiment, the trolley 310 has a single wheel 312 which is operatively coupled to an axle 314. Two handles 320, 322 are also coupled to the axle 314. This coupling may be direct or indirect but results in the axle acting as a pivot point when the handles are rotated around the wheel. The handles 320, 322 diverge from each other in a direction away from the wheel 312 and axle 314. In this example, each handle 320, 322 is formed from a single section which is angled outwardly. Unlike the embodiments previously described, in this example the axle 314 is not connected to the support legs 350, 352, but mounted between the handles 320, 322. The handles 320, 322 are connected to the lower frame member 345 of the load stabilising frame 340 to provide additional support for the handles 320, 322. This embodiment of the invention may also include a load carrying layer and a load stabilising layer, and may be provided in kit form. The other components of the fourth embodiment of the invention are similar to those already described.

Figure 15:
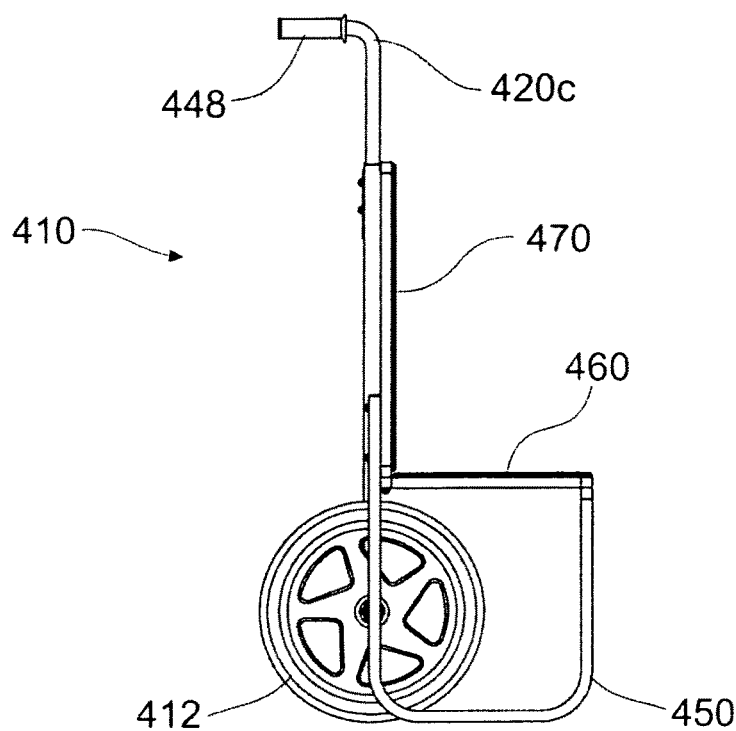
FIG. 15 is a left sided view of an alternative embodiment of a dual wheel trolley of the present invention.
Figures 16, 17:
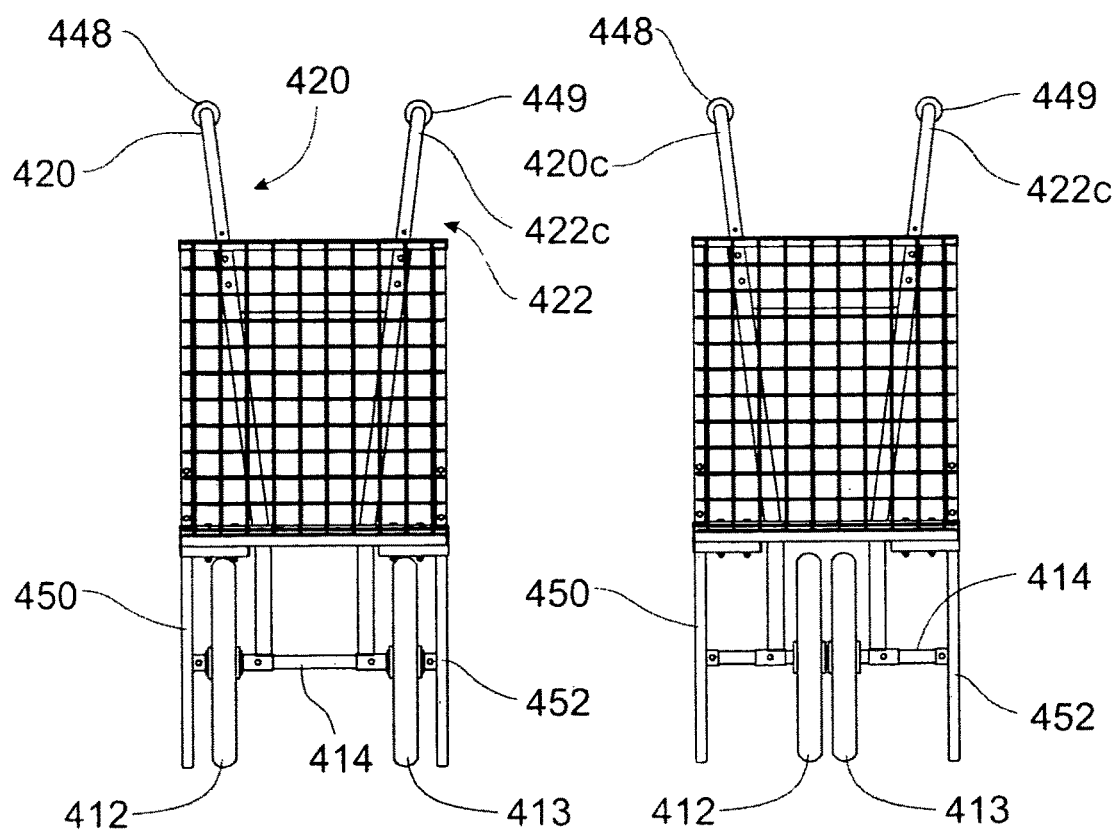
FIG. 16 is a front view of the trolley of FIG. 15 with the wheels positioned either side of the handles.
FIG. 17 is a front view of the trolley of FIG. 15 with the wheels positioned centrally between the handles.

FIGS. 15 to 17 show a fifth embodiment of the present invention. In this embodiment, a terminal portion of the end section 420*c*, 422*c* of each handle is angled backwardly at approximately 90 degrees. Each handle also includes a handle grip 448, 449. The configuration of the handles 420, 422 allows the user to grasp and manoeuver the narrower trolley with ease.

The trolley 410 has two wheels 412, 413 which are narrower than those described in the previous embodiments. It is preferred that the wheels 412, 413 are about 400 millimeters in diameter and 50 millimeters in width. As shown in FIG. 16, the wheels 412, 413 may be positioned either side of the handles 420, 422, proximal to the support legs 450, 452. Alternatively, both wheels 412, 413 can be mounted in a central position between the handles 420, 422, as shown in FIG. 17. The axle 414 is adapted to support the wheels 412, 413 in either position such that the configuration of the trolley is interchangeable to best suit the surface over which the trolley will be moved. This embodiment of the invention may also include a load carrying layer 460 and a load stabilising layer 470, and may be provided in kit form. The other components of the fifth embodiment of the invention are similar to those already described.

The fifth embodiment has been designed to be smaller and lighter than the embodiments previously described. Thus, the overall height of the trolley shown in FIGS. 15 to 17, when standing in upright position, is preferably around 1.3 meters. The base of the carry tray, or load carrying frame, is preferably about 410 to 420 millimeters above the ground. Preferably, the overall width of the carry tray, or load carrying frame, is preferably approximately 500 millimeters. It is preferred that the wheels are about 400 millimeters in diameter and 50 millimeters in width.

The trolley may also be manufactured from a lighter weight material such as 20 mm×20 mm square hollow section (SHS) or 20 mm round tube.

The compact size and light weight of this trolley makes it particularly useful in a residential and/or office setting. It is particularly well-suited for boxed goods including paper, printer toner cartridges, office equipment, kitchen supplies, bagged potting mix, and cartons of food or drinks.

Figure 18:
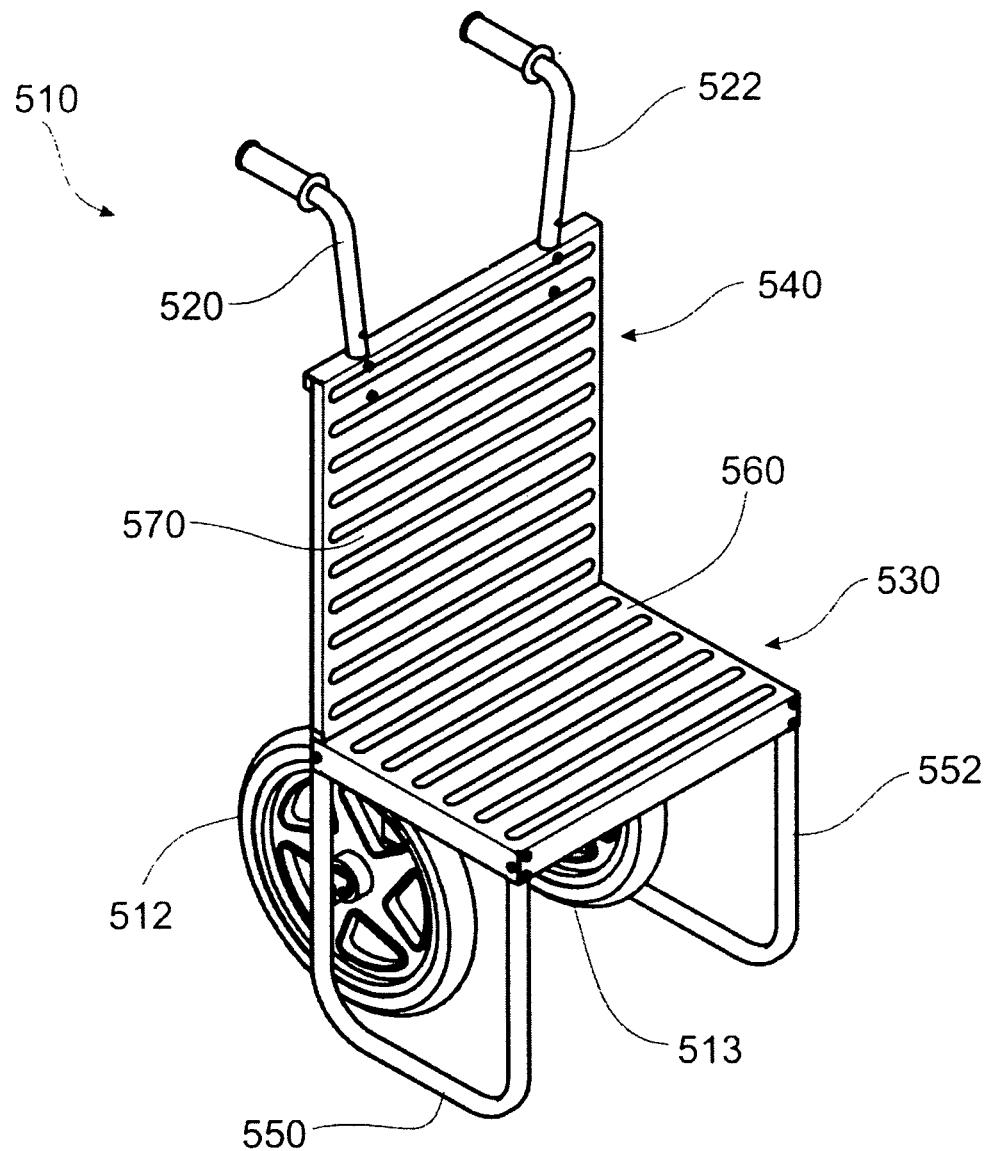
FIG. 18 is an isometric view of yet another alternative embodiment of a dual wheel trolley of the present invention.

FIG. 18 shows a sixth embodiment of the present invention. In this embodiment, the load carrying frame 530 and load stabilising frame 540 are formed by folding "C" sections into the perimeter of the load carrying layer 560 and load stabilising layer 570, respectively. The load carrying layer 560 and load stabilising layer 570, in this example, are formed from sheet metal. The integrally formed carrying frame/load carrying layer and load stabilising frame/load stabilising layer, and support legs 550, 552 are then bolted together to form a chair-like arrangement. The other components of the sixth embodiment of the invention are similar to those already described.

FIG. 18 shows a dual wheel trolley 510 having two wheels 512, 513 positioned either side of the handles 520, 522, proximal to the support legs 550, 552. However, it will be appreciated that the wheels 512, 513 could also be mounted in a central position between the handles 520, 522, as shown in the fifth embodiment of the present invention.

This embodiment of the invention is easier to manufacture, compared with previous embodiments having tubular frames and welded mesh layers, as less welding is required to construct the trolley.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

Throughout this specification, unless the context requires otherwise, the words "comprise", "comprises" and "comprising" will be understood to imply the inclusion of a stated integer or group of integers but not the exclusion of any other integer or group of integers.

The invention claimed is:

1. A trolley for manual transport of loads, wherein the trolley is moveable between a travel position and an upright, non-travel, loading position, wherein the trolley comprises:
   one or more wheels;
   an axle operatively coupled to the one or more wheels;
   a pair of handles connected directly or indirectly to the axle, the handles extending upwardly when the trolley is in the loading position;
   a load carrying frame for supporting a load extending forward at a fixed angle from the handles, and wherein the load carrying frame is above the one or more wheels when the trolley is in the loading position; and
   a pair of spaced support legs extending down from the load carrying frame, the pair of legs adapted to bear against a support surface and to support the load carrying frame substantially parallel to the support surface when the trolley is in the loading position,
   wherein the one or more wheels are positioned between the pair of spaced support legs; and
   wherein moving the pair of handles towards the support surface causes the pair of spaced support legs to be raised from the support surface and moves the trolley from the loading position to the travel position.

2. The trolley of claim 1, wherein the trolley includes only one wheel.

3. The trolley of claim 1, wherein the trolley includes only two wheels.

4. The trolley of claim 1, wherein the one or more wheels are pneumatic.

5. The trolley of claim 1, wherein the one or more wheels are mounted in central position, between the handles.

6. The trolley of claim 1, wherein the one or more wheels are more than one wheels which are positioned either side of the handles, proximal to the support legs.

7. The trolley of claim 1, wherein the trolley is interchangeable between a one-wheel and two-wheel trolley.

8. The trolley of claim 1, wherein the axle is attached to the support legs.

9. The trolley of claim 8, wherein the axle is removably attached to the support legs such that the trolley is convertible between a one-wheel trolley and a two-wheel trolley by changing the wheel configuration.

10. The trolley of claim 1, wherein the support legs are substantially U-shaped.

11. The trolley of claim 1, wherein the trolley includes a load stabilising frame attached to the load carrying frame.

12. The trolley of claim 11, wherein the load carrying frame and the load stabilising frame are both topped with a layer to form a load carrying platform and load stabilising platform.

13. The trolley of claim 11, wherein the load stabilising frame is attached to the handles.

14. The trolley of claim 1, wherein the handles each have three sections, being a first section, a second section, and an end section.

15. The trolley of claim 14, wherein the first section, located proximal to the axle is substantially vertical when the trolley is at rest, the second section is continuous with the first section and is angled outwardly, and the end section, located distal to the axle, is continuous with the second section.

16. The trolley of claim 14, wherein the first and second sections of the handles are formed integrally and the end section is manufactured as a separate piece and secured to the second section by an attachment means.

17. The trolley of claim 1, wherein a terminal portion of each handle is angled from a longitudinal axis of the handle.

18. The trolley of claim 1, wherein each handle includes a handle grip.

19. The trolley of claim 1, wherein the load carrying frame is positioned forward of the axle.

20. The trolley of claim 1, wherein at least a portion of the load carrying frame is directly above the one or more wheels when the trolley is in the loading position.

21. A kit for forming a trolley, the kit comprising:
   i. one or more wheels;
   ii. an axle for receiving the one or more wheels;
   iii. a pair of handles;
   iv. a load carrying frame; and
   v. a pair of support legs;
      wherein elements i to v are configured to be assembled to form the trolley of claim 1.

22. The kit of claim 21, wherein the kit includes a load stabilising frame.

* * * * *